H. J. EDWARDS.
UNIVERSAL JOINT.
APPLICATION FILED AUG. 8, 1917.
1,316,563.
Patented Sept. 23, 1919.
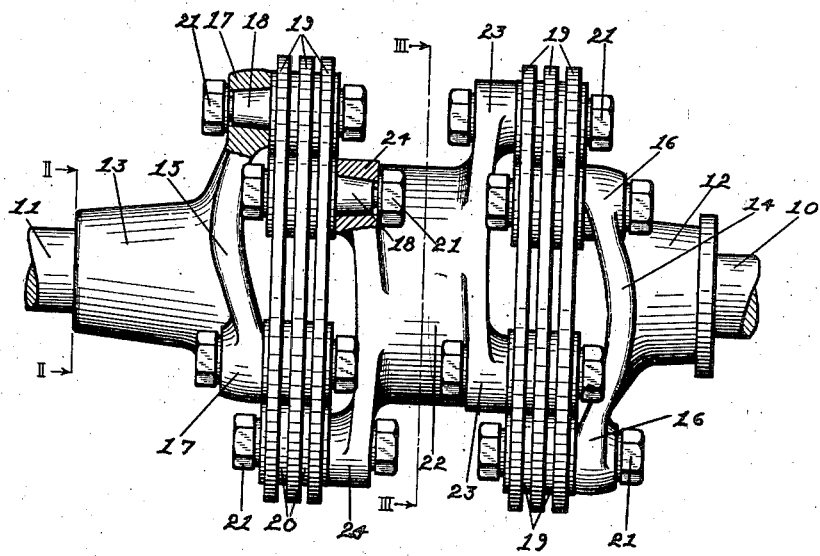
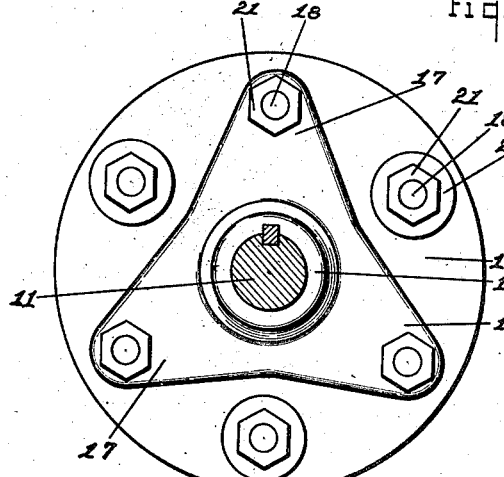
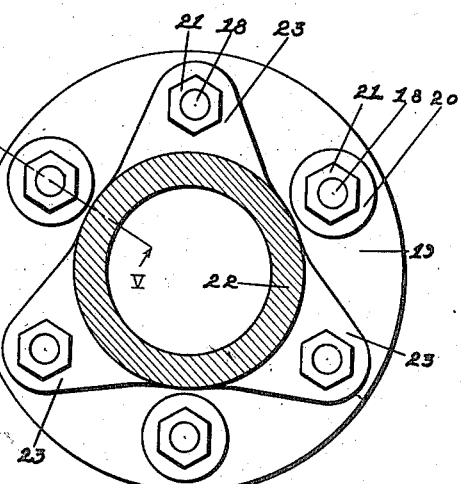
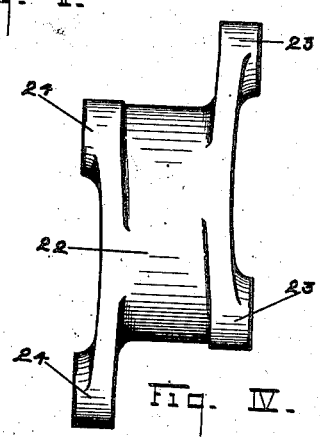
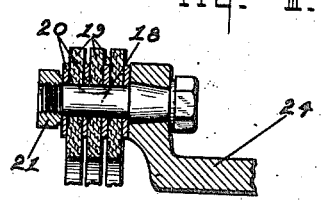
Inventor
Henry John Edwards
By Chester H. Braselton
Attorney

UNITED STATES PATENT OFFICE.

HENRY JOHN EDWARDS, OF ELYRIA, OHIO.

UNIVERSAL JOINT.

1,316,563.  Specification of Letters Patent.  Patented Sept. 23, 1919.

Application filed August 8, 1917. Serial No. 185,086.

*To all whom it may concern:*

Be it known that I, HENRY JOHN EDWARDS, a subject of the King of Great Britain and Ireland, residing at Elyria, in the county of Lorain and State of Ohio, have invented certain new and useful Improvements in Universal Joints, of which I declare the following to be a full, clear, and exact description.

This invention relates to improvements in universal joints and more particularly to the flexible connection used between two shafts, or shaft sections, to compensate for the continually changing alinement of such shafts, or shaft sections, while allowing perfect freedom to the parts in the rotating movement.

The principal object of this invention is to provide an improved universal joint or flexible connection, having a greater range of flexibility and which, at the same time, can be very simply and conveniently constructed.

A further object of this invention is to provide an improved universal joint in which the parts are provided with a greater number of points of angular connection than can be ordinarily conveniently produced, thus giving a greater strength to the joint.

Further objects, and objects relating to economies of manufacture and details of construction, will definitely appear from the detailed description to follow:

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a joint constructed in accordance with my invention.

Fig. II is a detail, sectional view, taken substantially on the line II—II of Fig. I.

Fig. III is a detail, transverse, sectional view, taken substantially on the line III—III of Fig. I.

Fig. IV is a detail view, in side elevation of the central member, and

Fig. V is a detail, fragmentary, sectional view, taken substantially on the line V—V of Fig. III.

In the drawings, similar reference numerals refer to similar parts throughout the several views, and the sectional views are taken looking in the direction of the little arrows at the end of the section lines.

Considering the numbered parts of the drawings, I have shown my improved universal joint as connecting the shaft sections 10 and 11. Spiders 14 and 15 are provided, each of which has a hub 12 and 13, which is connected to the corresponding one of the shaft sections 10 and 11. Each spider is provided with radiating arms 16 and 17. A bolt 18 extends through the end of each of said radiating arms and through a plurality of flexible rings 19, which may be conveniently made of leather or other suitable material, said rings being spaced apart and spaced from the ends of the arms by means of the washers 20. A nut 21 threaded on the ends of the bolt 18 secures the rings in place so that they are firmly connected at these points with the ends of the radiating arms of the spiders 14 and 15.

A central member 22 is provided which has, at each end thereof, the radiating arms 23 and 24 respectively. This central member is disposed between the two sets of flexible rings, illustrated in Fig. I, in such a manner that the radiating arms 23 and 24 respectively are located between the ends of the radiating arms 16 and 17 respectively of the spiders 14 and 15. Bolts 18 are provided, which pass through the ends of the radiating arms 23 and 24 and through the flexible rings 19, in the same manner as is shown in Fig. V, so that each set of flexible rings is connected with the central member by the bolts passing through the ends of the radiating arms on the central member at points between the points of connection of said flexible rings with the members 14 and 15 respectively.

From the description of the parts given above, the operation of this device should be very readily understood. It will be apparent that the rotation of the shaft section 10 will be communicated to the shaft section 11, or vice versa, perfectly, no matter whether the shaft sections 10 and 11 are in perfect alinement or not, and that this joint will provide a greater degree of flexibility than is ordinarily permitted in joints of this nature due to the fact that there are two sets of flexible rings, each of which constitutes a yielding part. The central member 22 may flex somewhat with reference to the hub 13, and the hub 14 may flex somewhat with reference to the central member 22, so that a greater degree of flexibility is provided. Furthermore, instead of having an angular driving connection between the parts at three points, I have provided such a connection at six points by means of the connection with the radiating arms of the central member at points between the points of connection with the radiating arms of the spider. This increases the strength of the joint, as there are a larger number of points at which this angular connection is made.

I am aware that the particular embodiment of my invention, which I have here shown and described, is susceptible of considerable variation without departing from the spirit of my invention. I have found, however, that this particular embodiment is desirable from many standpoints, and, therefore, I desire to claim the same specifically as well as broadly as indicated by the appended claims.

Having thus described my invention, what I claim as new and desire to secure Letters Patent is—

1. A universal joint embodying two yielding parts; and a frame for connecting said parts.

2. A universal joint comprising a member adapted to be secured to the end of each of the shaft sections to be connected; a flexible member secured to each of said members at a plurality of spaced points; and a central member secured to each of said flexible members at a plurality of spaced points disposed between the points of connection with said first mentioned members.

3. A universal joint comprising a member adapted to be secured to the ends of each of the shaft sections to be connected; a plurality of flexible rings connected to said member at spaced points; and a central member connected to said flexible rings at spaced points disposed between the points of connection with said first mentioned members.

4. A universal joint comprising a pair of spiders adapted to be secured to the ends of the shaft sections to be connected, and provided with a plurality of radiating arms; a plurality of flexible rings connected to the end of each of said spider arms; and a central member provided with a plurality of radiating arms on each end thereof, and connected to said flexible rings at points between the points of connection with said spider arms.

5. A universal joint comprising a pair of spiders, adapted to be secured to the ends of the shaft sections to be connected, and provided with a plurality of radiating arms; a plurality of spaced flexible rings secured to each of said spiders by bolts passing through the ends of the arms thereof; a central member provided with a plurality of radiating arms on each end thereof; and bolts passing through the ends of said arms, and connecting said flexible rings thereto, at points between the points of connection of said rings with said spider arms.

6. In a flexible shaft coupling, the combination of heads adapted to be attached to adjacent shaft sections, an intermediate member between the heads, said member and heads having projecting elements on their opposed faces, with reduced extensions at their outer ends, flexible rings between the heads and said member, said rings having openings into which said extensions project, and means to clamp said rings upon said elements.

7. In a flexible shaft coupling in combination, members adapted to be secured to the end of each of the shaft sections, a central member positioned between the first named members, and flexible elements connecting the central member to each of the first named members.

8. A universal joint comprising a member adapted to be secured to the end of each of the shaft sections to be connected, a flexible element connected to each of said members, and a central member secured to each of said flexible elements and connecting the same.

In testimony whereof I affix my signature.

HENRY JOHN EDWARDS.

DISCLAIMER.

1,316,563.—*Henry John Edwards*, Elyria, Ohio. UNIVERSAL JOINT. Patent dated September 23, 1919. Disclaimer filed February 16, 1921, by the assignee, *The Willys-Overland Company*.

Enters this disclaimer to all of claims 1, 2, 3, 7, and 8.

[*Official Gazette March 1, 1921.*]